Oct. 25, 1932.  I. KITROSER  1,884,996
ROTATING GLASS APPARATUS FOR COPYING GOFFERED FILMS
Filed Nov. 28, 1930
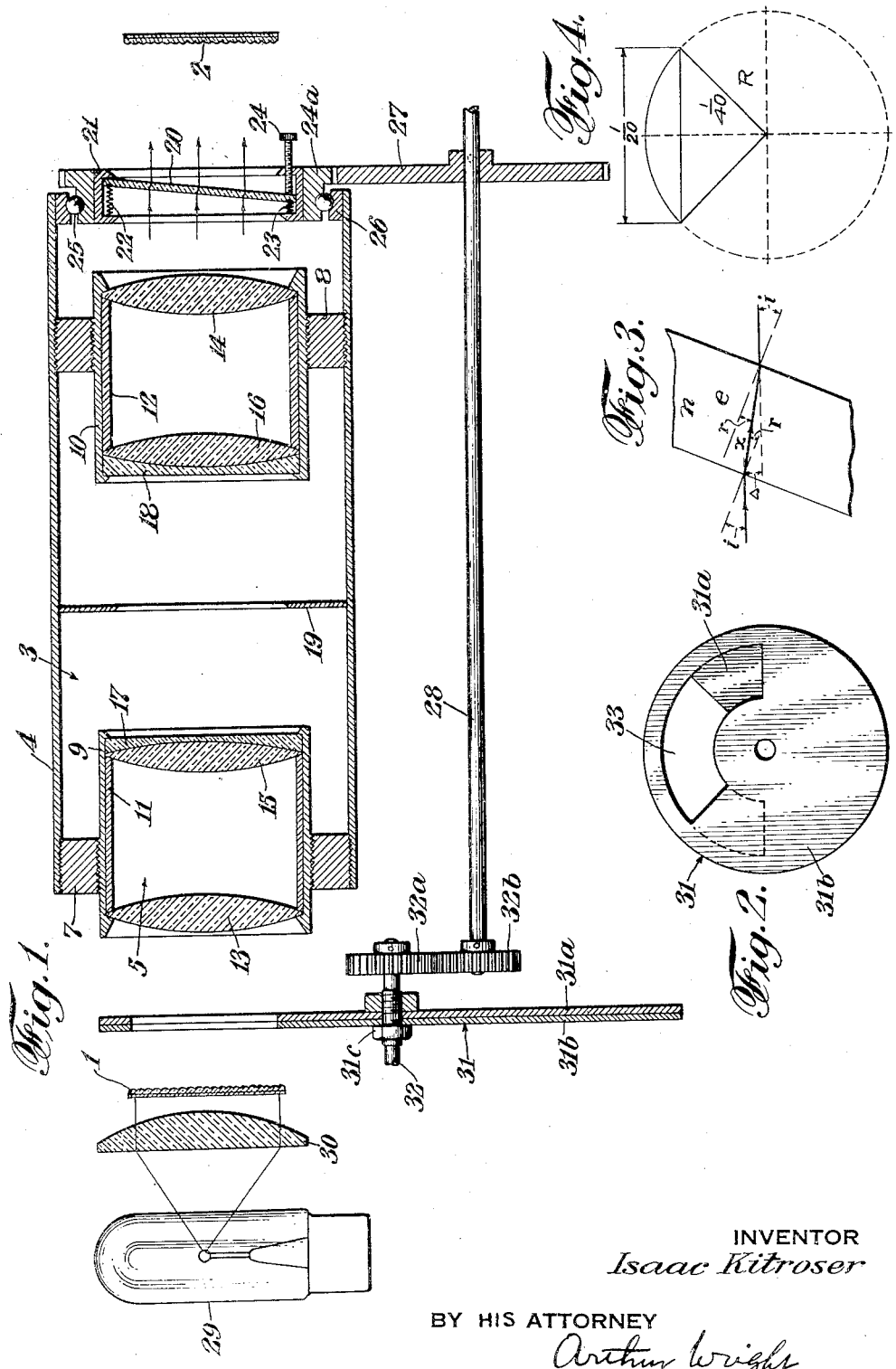
INVENTOR
*Isaac Kitroser*
BY HIS ATTORNEY
*Arthur Wright*

Patented Oct. 25, 1932

1,884,996

UNITED STATES PATENT OFFICE

ISAAC KITROSER, OF PARIS, FRANCE, ASSIGNOR TO KELLER-DORIAN COLORFILM CORPORATION, OF NEW YORK, N. Y., A CORPORATION OF DELAWARE

ROTATING GLASS APPARATUS FOR COPYING GOFFERED FILMS

Application filed November 28, 1930. Serial No. 498,625.

My invention relates particularly to an apparatus designed to deviate the image for copying from one picture having net-works therein to produce another picture also having net-works, but has relation especially to the making of copies of goffered films, that is to say, films having lenticular surfaces therein for producing pictures in colors.

The object of my invention is especially to provide an apparatus of the above character by means of which copies of pictures for use in cinematography, etc., may be effectively made on goffered films from goffered films by displacement of the light image preferably to the extent of the width of one line of goffering. As set forth in my previous application upon method and apparatus for causing reticulation, etc., Serial No. 382,381, filed July 31, 1929, I have disclosed means whereby the image of the film to be copied may be shifted the width of one line of goffering for the purpose of removing cloudy and moiré effects. In my later application entitled Rotating prism apparatus, Serial No. 488,308, filed October 13, 1930, I have disclosed an improvement over the subject matter of the earlier application above referred to. In accordance with my present invention I provide a still further improvement over the subject matter in the aforesaid applications, in that in the present application, in general, I provide a plate of glass which is located in a plane at an angle to the central axis of the rays through the objective and which is revolved in a plane at right angles to the said axis.

The present improvement is, therefore, designed to provide an optical system which is employed during the making of copies of goffered cinematographic films in order to have the moiré and cloudy effects eliminated in the making of the said copies. In my previous application, Serial No. 382,381, above referred to, I have provided a rotating prism which displaces the image during the exposure and to the extent desired. It has also been known previously to eliminate moiré effects by means of an oscillating plate of glass. My present invention is designed to overcome disadvantages of both of the said constructions previously provided for this purpose. By means of my present invention I obviate the necessity of constructing different sizes and thicknesses of prisms for accomplishing the desired deviation of the image and for adapting the copying to a gofferage of a certain size and, furthermore, I avoid the disadvantage of the vibration inherent in the oscillation of the plate of glass. In general, this is accomplished in accordance with my invention by providing a plate of glass located at an angle to the axis of the ray of light and rotating the said plate of glass on the said axis, any desired extent of deviation of the image being accomplished by merely changing the inclination of the plate of glass. Furthermore, a deviation depending upon the length of time during which a given image is exposed on the film by the shutter may be readily suited to the extent of deviation of the image by changing the angle of inclination of the said plate of glass to obtain the desired extent of deviation in the interval of time the image is being exposed by the shutter. Thus, accordingly, by the use of my apparatus one can pass instantly from pictures of one gofferage to pictures of another gofferage on films carrying different gofferages, by the mere adjustment of the angle of the rotating plate. Accordingly, my invention has the above advantages in causing the moiré effects to disappear, this being accomplished easily by the mere regulation of the angle of the rotating plate of glass, prisms and oscillating mechanisms thus not being necessary.

While my invention may be carried out in different ways, for example I have shown only one embodiment of the same in the accompanying drawing, in which—

Fig. 1 is a vertical section of a rotating image deviating mechanism made in accordance with my invention;

Fig. 2 is an elevation of a shutter used in connection with my invention;

Fig. 3 is a diagram showing the angles of deviation in connection with my invention; and Fig. 4 is another diagram illustrating the degree of shifting of the image.

In the drawing, I have shown a goffered film 1, as for example, for transverse lines of goffering, on which cinematographic pictures have been taken. A new transversely goffered film 2, on which reproduction is to be made, is located at the other end of the objective. Between the films 1 and 2 there is located a photographic objective 3 comprised of a mounting 4 carrying two symmetrical lens systems 5 and 6 held in place by screw-threaded rings 7 and 8 fastened in the mounting 4 and on tubes 9 and 10 respectively. Rings 11 and 12 therein hold their respective lenses in place. The lens systems 5 and 6 contain bi-convex lenses 13 and 14, bi-convex lenses 15 and 16 and plano-concave lenses 17 and 18. These lens systems 5 and 6 are of the usual well known construction, as shown in original Fig. 4 of the application of Andre Oswald, Serial No. 17,724, filed March 23, 1925. For instance, the film 1 is in the focal plane of the objective 5, said objective preferably having a long focus to decrease cat's eye and Petzwal curve effects and the film 2 is in the focal plane of the objective 6, said objective preferably, also, having a long focus for the same reason, and a diaphragm 19 is in the focal planes of both objectives 5 and 6. Consequently, the luminous rays between the objectives 5 and 6 are parallel and the diaphragm 19, therefore, when seen from the positions of either of the films 1 and 2, appears to be at infinity. Each of the lens systems is preferably constructed so as to correct them in the usual way for achromatism, spherical aberration and astigmatism. Midway between the systems 5 and 6 I locate the diaphragm 19 and adjacent thereto, outside the objective, I provide an inclined glass plate 20 for displacing the light rays. The effect is to displace the image taken on the film 2 so that each point thereof is made to take a circular path and thereby become enlarged into a circular area or a portion of a circle of larger size than said point. This has the effect of increasing the point to such a size as to equal the size of each lenticular element of the goffering. This inclined plate 20 is supported in a flanged ring 21 in an inclined position by having one edge forced to one side by means of a spring 22 carried in recesses in the ring 21 and the plate 20, and at the diametrically opposite side the plate 20 is supported on one face by means of a spring 23 carried in recesses in the ring 21 and the plate 20, the opposite face of said plate 20 being arranged to rest against the inner end of a screw 24 carried in one of the flanges of the ring 21. It is evident that by the adjustment of the screw 24 the inclination of the plate 20 may be secured to any desired degree. The ring 21 is in turn carried in a gear ring 24a supported in ball-bearings 25, carried in a ball-race 26 supported in the mounting 4. The gear ring 24a is rotated by a gear 27 on a shaft 28 driven at an uniform rate of speed from any suitable source of power and at any desired rate, as hereinafter referred to. For instance, the inclined plate 20 is preferably rotated 360° for each image of the cinematographic film.

With the said objective I provide an electric lamp 29 from which light in a line parallel to the goffering lines, passes through a collimatric lens 30, to provide parallel light for the film 1. In front of the film 1 there is a shutter 31, comprised of two relatively adjustable segments 31a and 31b held in position by a nut 31c, located on a shaft 32 having a gear 32a meshing with a gear 32b on the shaft 28, said shutter having an adjustable aperture 33 to permit the passage of light to the film 1. However, the inclined plate 20 is so located that the portion of the same adjacent to the screw 24 is pointed in a direction which is the same as the direction of each line of goffering when the shutter is in the middle of its period of exposure of the film, it being understood that the plate 20 and the shutter 21 turn the same number of revolutions per second and one revolution for each image exposed on the film 2. This shutter is rotated uniformly in any desired way and at any desired rate of speed, according to the advancement of the film 2.

In order to eliminate the moiré effects during the making of the copies the inclined plate 20 is given the inclination required as above, that is to say, sufficiently in order that the film, while being exposed at a particular image, will have the image displaced on the film 2 so that a theoretical point projected from the film 1 will then equal in size the width of one line of goffering, or at least such a width, when reproduced on the film 2. For instance, when the objectives 5 and 6 have a focus 100 mm., and when the shutter opening is 90° with a rotation of the shutter 360° for each 360° rotation of the inclined plate 20, and where the gofferage of both films is twenty lines per mm., the inclined plate must displace the image 1/20 mm.

For example, if I have a plate 20 made of glass with parallel faces of a given index and thickness, referring to Fig. 3, $$\frac{\Delta}{x} = \text{sine}\,(i-r)$$

$$\frac{e}{x} = \cos r$$

$$\frac{\text{sine}\,i}{\text{sine}\,r} = n,$$

where $i$ is the angle of incidence; $\Delta$ is the displacement between the ray of incidence and the emerging ray; $r$ is the angle of refraction, that is the angle between the path of rays within the glass and the perpendicular to the surface of entrance of the glass; $x$ is the distance the light travels from one surface to the other of the plate of glass; $e$ is the thickness of the plate of glass which may be, for example, 3 mm.; and $n$ is the index of refraction. But when the angle $i$, which is also the angle of inclination of the plate 20, is small, $r$ is still smaller, and, accordingly, I am able to simplify the equations as follows:

$$\frac{\Delta}{x} = i - r$$

$$\frac{e}{x} = \cos r = 1$$

$$\frac{i}{r} = n$$

so that $$\frac{\Delta}{e} = i - r, \quad \text{as } e \text{ is equal to } x$$

$$r = \frac{i}{n}$$

$$\frac{\Delta}{e} = i - \frac{i}{n} = i\left(1 - \frac{1}{n}\right)$$

$$\Delta = e i \cdot \frac{n-1}{n}$$

Therefore, the displacement of the image is equal to the thickness of the glass multiplied by the angle of inclination multiplied by one third, because here, for example, $$n = 1.5$$

and as, therefore, $$\frac{1.5 - 1}{1.5} = \frac{1}{3}$$

Accordingly, it being understood that this displacement is in a circular direction, it is necessary to take into consideration the openng of the shutter during this displacement. If the shutter is used with an opening of 90°, and a width of 1/20 mm. for an element of the gofferage, and where the radius of the displacement is $R = \Delta$, I obtain the equations—

$$\frac{\frac{1}{40}}{R} = \cos 45° = 0.7071$$

$$R = \frac{\frac{1}{40}}{\cos 45°} = \frac{1}{40 \times 0.7071} = \frac{1}{28.28}$$

$$\frac{1}{28.28} = e i \cdot \frac{n-1}{n} = 3 \times i \cdot x \frac{1.5 - 1}{1.5}$$

$$i = 0.03536 = 2° \, 2',$$

which is the angle of inclination of the plate 20 from the perpendicular to the axis of the objective.

While I have described my invention above in detail I wish it to be understood that many changes may be made therein without departing from the spirit of the same.

I claim:

1. An apparatus adapted for reproducing a photographic image carried on a goffered support, comprising a source of light, means for supporting and feeding a film to be copied and a film on which the copy is to be made, an objective, a diaphragm associated therewith and a transparent plate having parallel faces inclined at an angle to the axis of the rays passing through the objective and rotatably mounted on substantially said axis.

2. An apparatus adapted for reproducing a photographic image carried on a goffered support, comprising a source of light, means for supporting and feeding a film to be copied and a film on which the copy is to be made, an objective, a diaphragm associated therewith and a transparent plate having parallel faces inclined at an angle to the axis of the rays passing through the objective and rotatably mounted on substantially said axis, so as to displace the image sufficiently to eliminate the moiré effects.

3. An apparatus adapted for reproducing a photographic image carried on a goffered support, comprising a source of light, means for supporting and feeding a film to be copied and a film on which the copy is to be made, an objective, a diaphragm associated therewith and a transparent plate having parallel faces inclined at an angle to the axis of the rays passing through the objective and rotatably mounted on substantially said axis, so as to displace the image the width of one line of goffering to eliminate the moiré effects.

4. An apparatus adapted for reproducing a photographic image carried on a goffered support, comprising a source of light, means for supporting and feeding a film to be copied and a film on which the copy is to be made, an objective, a diaphragm associated therewith and a transparent plate having parallel faces inclined at an angle to the axis of the rays passing through the objective and rotatably mounted on substantially said axis, so as to rotate in unison with the shutter.

5. An apparatus adapted for reproducing a photographic image carried on a goffered support, comprising a source of light, means for supporting and feeding a film to be copied and a film on which the copy is to be made, an objective, a diaphragm associated therewith and a transparent plate having parallel faces inclined at an angle to the axis of the rays passing through the objective and rotatably mounted on substantially said axis, so as to displace the image sufficiently to eliminate the moiré effects, so as to rotate in unison with the shutter.

6. An apparatus adapted for reproducing a photographic image carried on a goffered support, comprising a source of light, means for supporting and feeding a film to be copied and a film on which the copy is to be made, an objective, a diaphragm associated therewith and a transparent plate having parallel faces inclined at an angle to the axis of the rays passing through the objective and rotatably mounted on substantially said axis, so as to displace the image the width of one line of goffering to eliminate the moiré effects, so as to rotate in unison with the shutter.

7. An apparatus adapted for reproducing a photographic image carried on a goffered support, comprising a source of light, means for supporting and feeding a film to be copied and a film on which the copy is to be made, an objective, a diaphragm associated therewith and a transparent plate having parallel faces inclined at an angle to the axis of the rays passing through the objective and rotatably mounted on substantially said axis, so as to rotate in unison with the shutter, the maximum inclination of the plate being directed in the direction of the individual lines of goffering in the middle of the light exposure by the shutter.

8. An apparatus adapted for reproducing a photographic image carried on a goffered support, comprising a source of light, means for supporting and feeding a film to be copied and a film on which the copy is to be made, an objective, a diaphragm associated therewith and a transparent plate having parallel faces inclined at an angle to the axis of the rays passing through the objective and rotatably mounted on substantially said axis, so as to displace the image sufficiently to eliminate the moiré effects, so as to rotate in unison with the shutter, the maximum inclination of the plate being directed in the direction of the individual lines of goffering in the middle of the light exposure by the shutter.

9. An apparatus adapted for reproducing a photographic image carried on a goffered support, comprising a source of light, means for supporting and feeding a film to be copied and a film on which the copy is to be made, an objective, a diaphragm associated therewith and a transparent plate having parallel faces inclined at an angle to the axis of the rays passing through the objective and rotatably mounted on substantially said axis, so as to displace the image the width of one line of goffering to eliminate the moiré effects, so as to rotate in unison with the shutter, the maximum inclination of the plate being directed in the direction of the individual lines of goffering in the middle of the light exposure by the shutter.

10. An apparatus adapted for reproducing a photographic image carried on a goffered support, comprising a source of light, means for supporting and feeding a film to be copied and a film on which the copy is to be made, an objective, a diaphragm associated therewith and a transparent plate having parallel faces inclined at an angle to the axis of the rays passing through the objective, means for rotating said plate and means for adjusting the angle of inclination thereof.

11. An apparatus adapted for reproducing a photographic image carried on a goffered support, comprising a source of light, means for supporting and feeding a film to be copied and a film on which the copy is to be made, an objective, a diaphragm associated therewith and a transparent plate having parallel faces inclined at an angle to the axis of the rays passing through the objective, means for rotating said plate on substantially the axis of the rays passing through the objective and means for adjusting the angle of inclination thereof.

12. An apparatus adapted for reproducing a photographic image carried on a goffered support, comprising a source of light, means for supporting and feeding a film to be copied and a film on which the copy is to be made, an objective, a diaphragm associated therewith and a transparent plate having parallel faces inclined at an angle to the axis of the rays passing through the objective, means for rotating said plate and means for adjusting the angle of inclination thereof comprising a spring and an adjustable thumb-screw for supporting the edge of the plate.

13. An apparatus adapted for reproducing a photographic image carried on a goffered support, comprising a source of light, means for supporting and feeding a film to be copied and a film on which the copy is to be made, an objective, a diaphragm associated therewith and a transparent plate having parallel faces inclined at an angle to the axis of the rays passing through the objective, means for rotating said plate on substantially the axis of the rays passing through the objective and means for adjusting the angle of inclination thereof comprising a spring and an adjustable thumb-screw for supporting an edge of the plate.

14. An apparatus adapted for reproducing a photographic image carried on a goffered support, comprising a source of light, means for supporting and feeding a film to be copied and a film on which the copy is to be made, an objective, a diaphragm associated therewith and a transparent plate having parallel faces inclined at an angle to the axis of the rays passing through the objective, means for rotating said plate and means for adjusting the angle of inclination thereof comprising a spring, an adjustable thumb-screw for supporting an edge of the plate and a spring for supporting a diametrically opposite edge of the plate.

15. An apparatus adapted for reproducing a photographic image carried on a goffered support, comprising a source of light, means for supporting and feeding a film to be copied and a film on which the copy is to be made, an objective, a diaphragm associated therewith and a transparent plate having parallel faces inclined at an angle to the axis of the rays passing through the objective, means for rotating said plate on substantially the axis of the rays passing through the objective and means for adjusting the angle of inclination thereof comprising a spring, an adjustable thumb-screw for supporting an edge of the plate and a spring for supporting a diametrically opposite edge of the plate.

ISAAC KITROSER.